March 4, 1952   J. R. MARSHALL   2,587,869
BOWL SCRAPER ATTACHMENT FOR TRACTORS
Filed May 3, 1947   2 SHEETS—SHEET 1
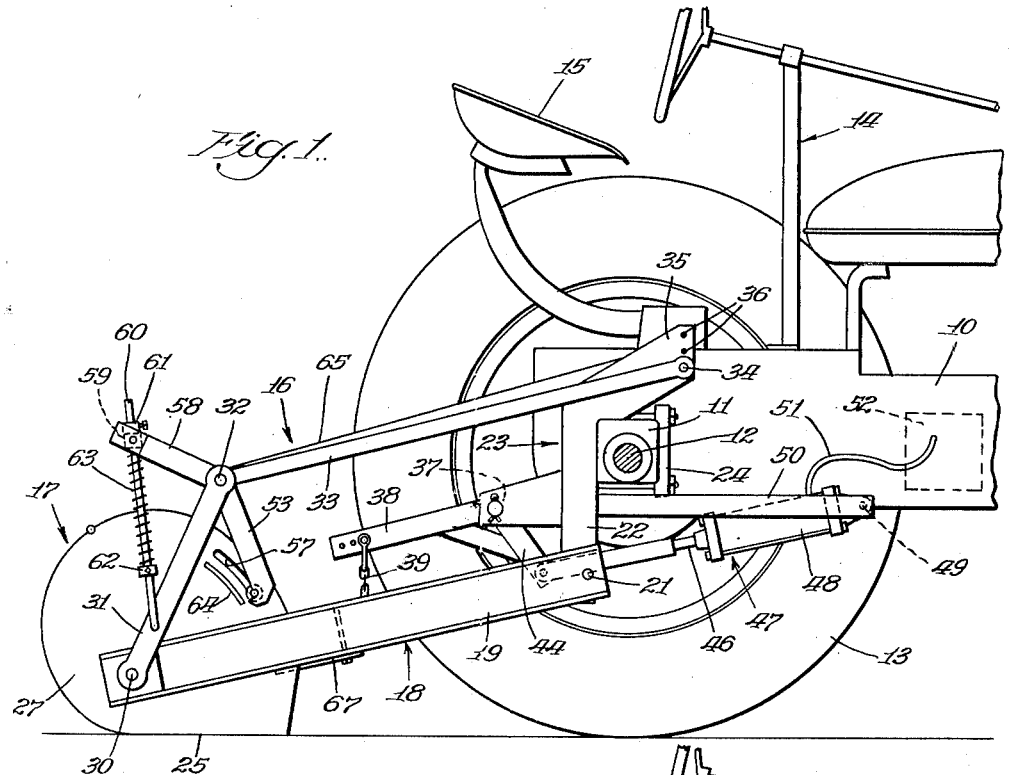
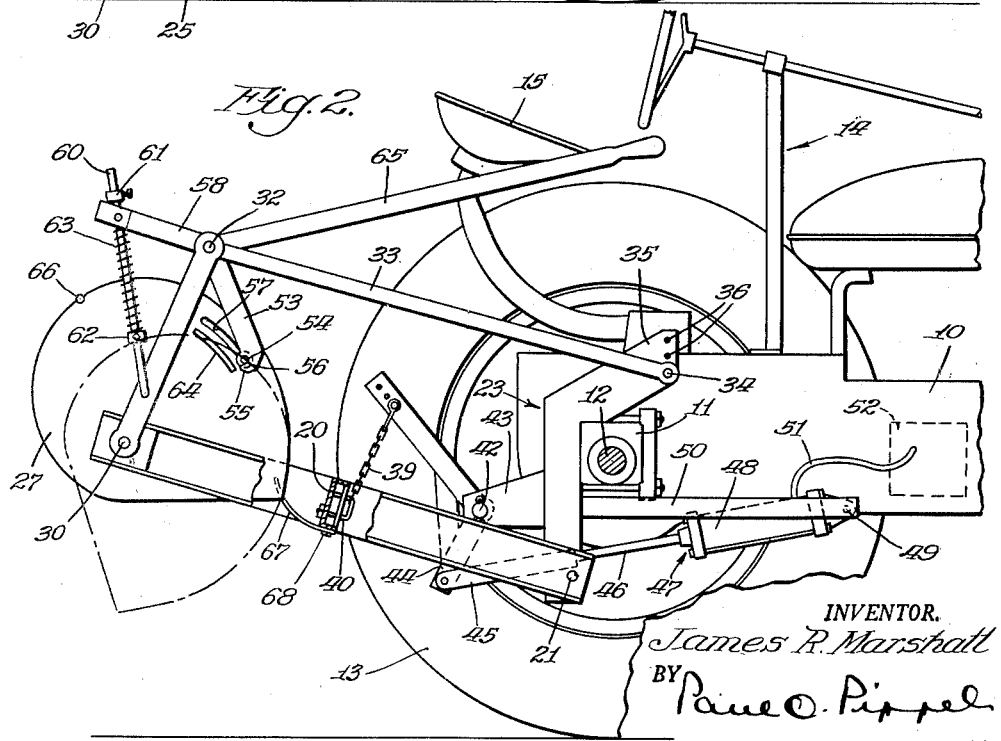
INVENTOR.
James R. Marshall
BY Paul O. Pippel
Atty.

March 4, 1952

J. R. MARSHALL 2,587,869

BOWL SCRAPER ATTACHMENT FOR TRACTORS

Filed May 3, 1947

INVENTOR.
James R. Marshall
BY
Paul O. Pippel
Atty.

Patented Mar. 4, 1952

2,587,869

UNITED STATES PATENT OFFICE 2,587,869

BOWL SCRAPER ATTACHMENT FOR TRACTORS

James R. Marshall, Temple, Tex., assignor to International Harvester Company, a corporation of New Jersey Application May 3, 1947, Serial No. 745,790

7 Claims. (Cl. 37—124)

This invention relates to earth moving machinery and particularly to an implement of the revolving bowl type having an earth scraping blade combined with a receptacle capable of retaining and transporting dirt, and which can be dumped at will to release the dirt which has accumulated therein. More specifically, the invention concerns a frameless bowl scraper and supporting structure adapted to be attached to a tractor having power transmission means for raising and lowering the implement by power derived from the tractor power plant.

An object of the invention is to provide a novel tractor mounted revolving bowl scraper and means controllable from the tractor for raising and dumping the bowl to remove the dirt accumulated therein.

Another object of the invention is to provide a scoop or scraper connected to a tractor in draft receiving relation by parallel linkage designed to accommodate raising and lowering of the implement without substantial change in the position thereof.

Another object of the invention is to provide in a tractor mounted bowl scraper adapted to accumulate and transport dirt, means effective in the transport position of the bowl to prevent the loss of dirt therefrom.

A further object of the invention is to provide a bowl scraper attachment which may be readily attached to and detached from an ordinary farm tractor and operatively connected to the power lifting mechanism thereof for raising the implement to transport.

Still another object of the invention is to provide a bowl scraper which is adapted to operate either forwardly or rearwardly, wherein the bowl is the revolving type and may be rotated in either direction, and wherein the scraper blade may be utilized to spread the earth when the machine is operating in either a forward or reverse direction.

Other objects and advantages of the invention will become clear from the following detailed description when read in conjunction with the accompanying drawings, wherein:

Figure 1 is a view in side elevation of the rear end of a tractor with one drive wheel removed showing a bowl scraping attachment embodying the features of the present invention attached thereto in ground working position;

Figure 2 is a view similar to Figure 1 showing the scraper in raised or transport position.

Figure 3:
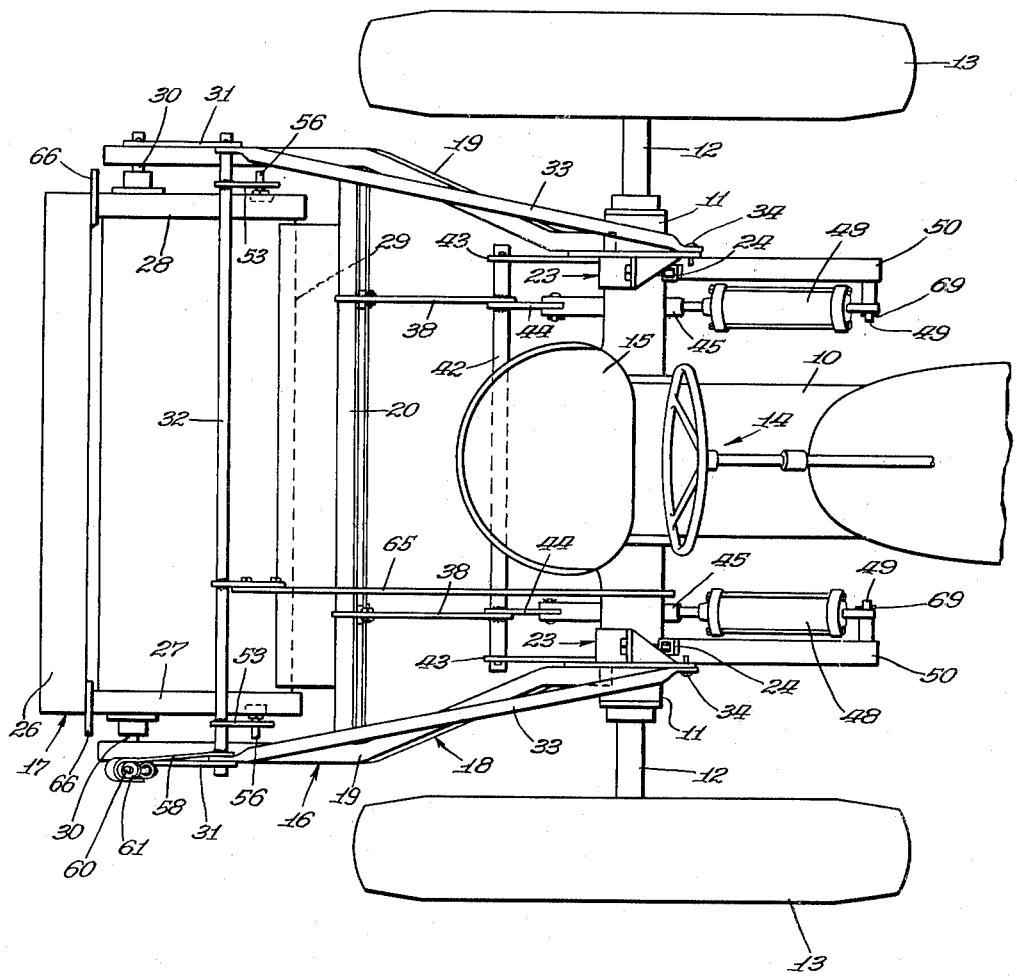
Figure 3 is a plan view of the structure shown in Figure 1.

In the drawings, the tractor to which the implement embodying the features of the present invention is attached is provided with a longitudinally extending body 10, a transverse rear axle structure 11 housing a rear axle 12 serving for the mounting of laterally spaced rear drive wheels 13. The tractor is likewise provided with conventional steering mechanism 14 and an operator's station 15.

The implement of the present invention as illustrated in the drawings is a revolving bowl scraper and is mounted upon the tractor to be totally supported thereupon during transport by linkage generally indicated by the numeral 16 upon which is mounted for rotation with respect thereto a scraper bowl 17.

Supporting linkage 16 includes a longitudinally extending draft receiving member 18 comprising laterally spaced arms or beams in the form of channel members 19. Members 19 are rigidly connected by a bracing structure in the form of a channel member 20. The forward ends of beams 19 are mounted upon pivot pins 21, each of which is carried by the depending portion 22 of a bracket 23, one of which is removably secured adjacent each end of the rear axle structure 11 on opposite sides of the tractor body 10 by a clamp 24. The link or draft structure 18 thus is capable of generally vertical swinging movement about pivot pins 21.

The revolving scraper 17 is mounted between the rear ends of the arms 19 of draft member 18 and is a transversely extending bowl having a bottom 25, a rear wall 26, and end walls 27 and 28. The bottom 25 of the bowl is provided with a forward cutting edge 29 adapted to scrape the earth to be accumulated by the bowl and to perform other functions hereinafter set forth. The periphery of the bowl and of the end members 27 and 28 as indicated in Figures 1 and 2 is eccentric to the center of gravity of the bowl, and each end of the bowl is provided with a pivot bolt 30 offset from the center of gravity thereof for pivotally connecting the bowl to the rear ends of the arms 19. Likewise mounted upon the pivot bolt 30 is an upright supporting member 31, the upper end of which is pivotally mounted upon a transversely extending shaft 32. This shaft 32 extends the entire width of the revolving bowl 17 and a similar upright member 31 is provided at each end of the bowl for connection between the respective pivot bolt 30 and the shaft 32. A longitudinally extending link 33 is likewise mounted upon each end of the transverse shaft 32 and each link 33 extends forwardly for pivotal connection at 34 to an extension 35 of the bracket 23. It will thus be observed that links 33 and arms 19 of draft member 18 constitute parallel link supports for the revolving bowl 17 so that upon vertically swinging the links 19 and 33 about their pivotal connections to the bracket 23 upon the tractor, the bowl 17 will maintain substantially the same position as it moves between operating and transport positions. The parallel relationship of the links 19 and 33 may be varied somewhat by connecting the forward ends of the links 33 to one or the other of the openings 36 in the bracket 23.

Vertical movement of the implement between operating and transport positions is accomplished by lifting mechanism including a bell crank 37 having a rearwardly extending arm 38 which is connected by a flexible chain 39 to a U bolt 40 secured to the transverse bracing beam 20. Two of these bell cranks 37 are provided at laterally spaced locations on a transversely extending shaft 42 rotatably mounted in bearings carried by arms 43, one of which is affixed to and extends forwardly from each of the brackets 23 at opposite sides of the tractor body 10. Bell crank 37 is provided with another arm 44 which extends downwardly and has pivotally connected to its lower end a sleeve member 45 adapted to receive for limited sliding movement therein a piston rod 46 of a ram unit 47 including a cylinder 48. Cylinder 48 is anchored by a pin 49 to a support 50 affixed to and extending forwardly from the depending portion 22 of the bracket 23. As shown in Figure 3, a ram unit 47 is provided at each side of the tractor body for rocking the respective bell cranks 37, and each of the bell cranks 37 is connected by a chain 39 to the bracing bar 20 for lifting purposes. Ram unit 47 is hydraulically operated and receives fluid under pressure through a hose 51 from a pump 52 deriving power from the tractor power plant. The cylinder shown is a one way hydraulic cylinder and the fluid admitted thereto under pressure extends the piston as shown in Figure 2. The piston rod 46 engaging the end of sleeve 45 rocks the bell crank 37 in a clockwise direction to raise the implement from the ground. Upon release of the fluid from the cylinder the implement returns to operating position. The operation of the ram units 47 is under the control of the tractor operator from his seat thereon by the manipulation of control mechanism (not shown.)

The bowl scraper of the present invention is of the tumbling or revolving type and it is well adapted for a number of operations, such as grading and leveling, terrace and ditch construction and the like. In Figure 1 the implement is in position for scraping dirt and filling the bowl therewith, and when the bowl has been filled it is raised to a position such as shown in Figure 2, whereupon the bowl is revolved or dumped in order to release the dirt. Mechanism is therefore provided for holding the bowl in fixed positions for performing the desired operations. Such mechanism is in the form of a releaseable latch which may be controlled by a tractor operator from his station thereon. This mechanism includes a latch arm 53 affixed to the transverse shaft 32 adjacent the end plate 27 of the bowl. Latch arm 53 is provided with a notch 54 at the end thereof having an overhanging portion 55. Notch 54 is adapted to receive a bolt 56 extending through a slot 57 in each of the bowl ends. Slot 57 defines an arc having as its center the pivot axis of the bowl as represented by the pivot bolt 30. It will be noted that in the positions indicated in Figures 1 and 2, the bolt 54 is in one end of the slot 57. By loosening the bolt and advancing it in the slot 57, the operator will be able to adjust the angle of the bottom 25 of the bowl and therefore the angle of penetration of the cutting edge 29 thereof with respect to the ground to secure deeper or shallower penetration.

The latch arm 53 is biased to engaged position with the bolt 56 by mechanism including an arm 58 likewise affixed to the transverse shaft 32 and having its outer end looped to receive for pivotal movement a swivel 59 having an opening therein to slidably receive a rod 60, the lower end of which is pivotally connected to the supporting member 31 and the upper end of which is provided with an adjustable collar 61. A collar 62 is likewise provided on the lower portion of the rod 60 and a spring 63 surrounding the rod is confined between the swivel 59 and the collar 62. The spring 63 exerts upward pressure against the arm 58 to urge the side of the latch arm 53 carrying the notch 54 into engagement with the bolt 56. It is, of course, possible for the bolt 56 to be displaced from the notch in the latch arm 53. In order to avoid the latch arm overriding the bolt 56 and permitting the opposite side of the latch arm to come into engagement with the bolt, an arcuate member 64 is provided adjacent the slot 57 and concentric therewith. Member 64 projects outwardly from the outer face of the end wall 27 and serves as a guide track for the latch arm 53, and should the latch arm override the bolt 56, the extension portion 55 of the latch arm will engage the arcuate member 64 and prevent the swinging of the latch arm past the bolt. The latch arm 53 is released from engagement with the bolt 56 to permit the bowl to revolve to a position such as is indicated in dotted lines in Figure 2, by a lever 65 secured to the transverse rock shaft 32 and extending forwardly to a position accessible to the tractor operator from his station thereon.

If the dirt which has accumulated in the bowl is merely to be dumped, the tractor operator raises the implement above the ground and operates his lever 65 to release the latch arm 53, and permit rotation of the bowl. The implement is then again lowered to the ground and the tractor moved forwardly or rearwardly with suitable manipulation of the lever 65. Contact of the bowl with the ground and the movement of the tractor causes the bowl to revolve about the eccentric peripheries of the ends 27 and 28 until it has returned to the desired operating position, whereupon the latch is again engaged with the bolt 56. If the dirt is to be spread, the bowl, after dumping, is retained in the position indicated in dotted lines in Figure 2. At this point, the operator allows the latch arm 53 to engage a pin 66 similar to pin 56 and projecting outwardly from the end wall 27 and 28 adjacent the peripheries thereof. It may be noted that the pins 56 and 66 are equidistant from the pivot bolt 30. In this position the cutting edge 29 of the bowl is directed downwardly in a suitable position for engaging and spreading dirt. The cutting edge 29 of the bowl is maintained at the desired height above the ground for spreading dirt at the desired thickness by operating the ram unit to lower the implement to the selected height above the ground.

Of course, dirt may be dumped from the bowl 17 when the tractor is traveling either forwardly or rearwardly. Likewise, in the position of the bowl as indicated in dotted lines in Figure 2, the dirt may be spread when the tractor is in reverse in the same manner as when the tractor is traveling forwardly. When spreading dirt in reverse, it may be desirable under certain conditions for the operator to exert pressure upon the lever 65 to retain the arm 53 in latching engagement with the pin 66.

When the bowl is in scraping position as indicated in Figure 1, it is desirable that the dirt have free access to the bowl without hindrance. Likewise, upon raising the bowl it is desirable that the dirt be retained therein with a minimum of loss. When transporting the filled bowl from one place to another, dirt is retained therein by means of a flexible flap member 67 which extends transversely of the bowl parallel to the cutting edge thereof and is secured to the undersurface of the bracing bar 20 by bolts 68. As indicated in Figure 1, the flexible flap member 67 extends rearwardly from the bracing bar 20 and is spaced sufficiently above the cutting edge 29 of the bowl so that it will not interfere with the accumulation of dirt therein. As indicated in Figure 2, however, when the bowl is raised to transport position, the flap 67 which is made of flexible material assumes the position indicated therein against the cutting edge of the bowl and functions to prevent the spilling of dirt therefrom.

It may be noted that the implement of the present invention, including the bowl 17 and the connecting linkage 16, may be connected to the tractor as a unit. Not only the connecting bracket 23 and the clamps 24 for securing the bracket to the rear axle structure of the tractor are a part of the unit, but also the supporting member 50 to which the hydraulic cylinder is anchored. Removal of the implement from the tractor is accomplished simply by releasing the clamps 24 and removing the cylinder 48 from its connection to the pin 49, the cylinder being held in place thereon by a cotter key 69. The ram unit 47 may be retained with the tractor, the piston rod 46 readily sliding from the sleeve member 45.

It is believed that the operation of the implement of this invention will be clearly understood from the foregoing description. It should be understood, however, that modifications may be made in the invention without departing from the spirit thereof or the scope of the appended claims.

What is claimed is:

1. In combination with a tractor having a source of power and a transverse rear axle structure, a unitary frameless earth scraper attachment comprising laterally spaced pairs of vertically spaced generally parallel link structures, an earth scraping device pivotally mounted at the rear ends of said pairs of links and extending transversely therebetween, said scraper being tiltable about a transverse axis, means for releasably holding said scraper against tilting, means serving as brackets to which the forward ends of said pairs of links are respectively pivotally connected for generally vertical swinging movement to raise and lower the scraper, a transverse rock shaft carried by and extending between said brackets, clamping means carried by said brackets for detachably connecting the latter to the tractor rear axle structure at laterally spaced locations thereon, whereby the implement is supported entirely upon the tractor, a bell crank mounted on said rock shaft, flexible lifting connections between one arm of said bell crank and said parallel link structures, a ram unit deriving power from said source of fluid pressure to raise and lower the scraper comprising a sleeve member pivotally connected to the other arm of said bell crank, a cylinder detachably carried by one said bracket, and a piston rod movable in said cylinder and slidably receivable in said sleeve member to accommodate free vertical floating movement of the bowl independent of said ram unit, whereby in its ground engaging position the bowl may be rotated through a complete revolution during operation thereof.

2. In combination with a tractor having a transverse rear axle structure, an earth scraper attachment comprising laterally spaced pairs of vertically spaced generally parallel link structures, means pivotally connecting the forward ends of said links to the tractor for vertical swinging movement, a scraper bowl extending transversely between said pairs of links and mounted at the rear ends thereof for movement therewith in a substantially vertical plane, said bowl having a flattened base portion substantially parallel to the ground, and a forward transverse cutting edge for penetrating the soil in its operating position, means for vertically moving the scraper bowl between operating and transport positions while maintaining said base portion substantially parallel to the ground, a brace member connecting the lower of said link structures in advance of the cutting edge of the bowl and parallel thereto, and a flexible flap member secured to said brace member in overlapping relation to said cutting edge, said flap member being engageable with said cutting edge in the raised position of the bowl to prevent loss of dirt therefrom prior to dumping.

3. In combination with a tractor, an earth scraper attachment comprising a dumping bowl extending transversely of the tractor and having a forward transverse cutting edge, means connecting said bowl to the tractor in draft receiving relation thereto, means for raising and lowering said bowl, a transverse flap member of flexible material carried by said connecting means in advance of the cutting edge of said bowl and in overlapping relation thereto, said member being engageable with the cutting edge of said bowl in a raised position thereof to prevent spilling of dirt therefrom prior to dumping.

4. In combination with a tractor, an earth scraper attachment comprising a scraper bowl extending transversely of the tractor, said bowl having a bottom, end and rear walls and a forward cutting edge, linkage pivotally connected to the tractor for vertical swinging movement and extending rearwardly therefrom, means pivotally connecting said linkage to the end walls of said bowl for rotation of the bowl about a transverse axis, a supporting member carried by the linkage, a latch pin carried by an end wall of the bowl, an arm pivotally mounted on said supporting member and swingable to opposite sides of said pin, a notch formed in one side of said arm to receive said pin, means biasing the notched side of the arm into engagement with the pin, whereby said pin is seated in the notch in said arm during rotation of the bowl, and means preventing overriding of the pin and arm comprising a guide member carried by the bowl and engageable with the notched side of said arm during rotation of the bowl to limit swinging thereof and insure reception of the pin in the notch.

5. In combination with a tractor, an earth scraper attachment comprising a scraper bowl extending transversely of the tractor, said bowl having a bottom, end and rear walls and a forward cutting edge, linkage pivotally connected to the tractor for vertical swinging movement and extending rearwardly therefrom, means pivotally connecting said linkage to the end walls of said bowl for rotation of the bowl about a transverse axis, a supporting member carried by the linkage, a latch pin carried by an end wall of the bowl, an arm pivotally mounted on said supporting member and swingable to opposite sides of said pin, a notch formed in one side of said arm to receive said pin, means biasing the notched side of the arm into engagement with the pin, whereby said pin is seated in the notch in said arm during rotation of the bowl, and means preventing overriding of the pin and arm comprising an arcuate member carried by the bowl adjacent said pin and engageable with the notched side of said arm, said arcuate member serving as a track to guide the arm during rotation of the bowl to prevent swinging thereof past the pin and insure reception of the pin in the notch.

6. In combination with a tractor, an earth scraper attachment comprising a scraper bowl extending transversely of the tractor, said bowl having a bottom, end and rear walls and a forward cutting edge, linkage pivotally connected to the tractor for vertical swinging movement and extending rearwardly therefrom, means pivotally connecting said linkage to the end walls of said bowl for rotation of the bowl about a transverse axis, a supporting member carried by the linkage, a latch pin carried by an end wall of the bowl, an arm pivotally mounted on said supporting member and swingable to opposite sides of said pin, a notch formed in one side of said arm to receive said pin, means biasing the notched side of the arm into engagement with the pin, whereby said pin is seated in the notch in said arm during rotation of the bowl, and means carried by the bowl to prevent swinging of said arm past said pin during rotation of the bowl.

7. In combination with a tractor having a power plant and a transverse rear axle structure, an earth scraper attachment comprising a bowl extending transversely of the tractor, said bowl having a base portion with a forward earth-penetrating edge, linkage extending longitudinally of the tractor and pivotally connected at one end thereto for vertical swinging movement, means pivotally connecting said bowl scraper to the other end of said linkage for rotation about a transverse axis to dump accumulated earth therefrom, means for vertically swinging said linkage to raise and lower the scraper bowl, and a flexible flap member carried by said linkage in overlapping relation to the earth-penetrating edge of the bowl, said flap member being engageable with said bowl edge in the raised position of the bowl to prevent loss of dirt therefrom during transport.

JAMES R. MARSHALL.

REFERENCES CITED

The following references are of record in the file of this patent:

UNITED STATES PATENTS

| Number | Name | Date |
|---|---|---|
| 1,775,314 | Mahoney et al. | Sept. 9, 1930 |
| 1,868,123 | Tharp | July 19, 1932 |
| 2,121,240 | Austin | June 21, 1938 |
| 2,203,615 | Gurries | June 4, 1940 |
| 2,297,301 | Hipple | Sept. 29, 1942 |
| 2,308,590 | Douthitt | Jan. 19, 1943 |
| 2,324,840 | Hipple | July 20, 1943 |
| 2,350,327 | Ender | June 6, 1944 |
| 2,411,688 | Keim et al. | Nov. 26, 1946 |
| 2,423,894 | Lambert | July 15, 1947 |